(12) United States Patent
Levi et al.

(10) Patent No.: US 11,429,516 B1
(45) Date of Patent: Aug. 30, 2022

(54) RESOURCE VERIFICATION FOR AN APPLICATION

(71) Applicant: Applied Materials Israel Ltd., Rehovot (IL)

(72) Inventors: Elad Levi, Rehovot (IL); Moshe Herskovits, Nes Ziona (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 17/234,764

(22) Filed: Apr. 19, 2021

(51) Int. Cl.
  *G06F 9/50* (2006.01)
  *G06F 11/36* (2006.01)
  *G06F 8/41* (2018.01)
  *G06F 11/30* (2006.01)

(52) U.S. Cl.
  CPC .......... *G06F 11/3692* (2013.01); *G06F 8/433* (2013.01); *G06F 9/5055* (2013.01); *G06F 11/3051* (2013.01); *G06F 11/3664* (2013.01); *G06F 2209/503* (2013.01); *G06F 2209/508* (2013.01)

(58) Field of Classification Search
  CPC ....................................................... G06F 9/50
  See application file for complete search history.

(56) References Cited

U.S. PATENT DOCUMENTS

| | | | | |
|---|---|---|---|---|
| 9,348,576 | B2 * | 5/2016 | Hofhansl | G06F 8/65 |
| 2005/0034129 | A1 * | 2/2005 | Chew | G06F 9/4843 718/100 |
| 2015/0106524 | A1 * | 4/2015 | Lu | H04L 67/34 709/226 |
| 2020/0319907 | A1 * | 10/2020 | Jain | H04L 67/1097 |

OTHER PUBLICATIONS

Wikipedia, "Virtual Machine," Feb. 21, 2021 at https://web.archive.org/web/20210221214138/http://en.wikipedia.org/wiki/Virtual_machine, 7 pages.
Wikipedia, "Docker (software)," Feb. 10, 2021 at https://web.archive.org/web/20210210180736/https://en.wikipedia.org/wiki/Docker_(software), 7 pages.

(Continued)

*Primary Examiner* — Jae U Jeon
(74) *Attorney, Agent, or Firm* — Lowenstein Sandler LLP

(57) ABSTRACT

There is provided a system and method of resource verification for an application, the method comprising: obtaining a checklist of resources required for running the application, wherein the checklist is generated by: obtaining source code and an executable file of the application; running the executable file, and monitoring resources accessed by the application during execution thereof and corresponding access type of each resource, giving rise to a first list of resources; performing static code analysis of the source code including searching the source code for one or more specific code patterns indicative of respective resources to be accessed and corresponding access types thereof, and generating a second list of resources; and mapping the first list and second list of resources to generate the checklist of resources. The method further comprises automatically verifying the checklist of resources, giving rise to a verification result.

30 Claims, 8 Drawing Sheets

(56) References Cited

OTHER PUBLICATIONS

Wikipedia, "Performance Monitor," Nov. 24, 2020 https://web.archive.org/web/20201124163722/https://en.wikipedia.org/wiki/Performance_Monitor, 2 pages.
"FindBugs™—Find Bugs in Java Programs," Feb. 12, 2021 at https://web.archive.org/web/20210212104944/http://findbugs.sourceforge.net/, 4 pages.
"Code Quality and Code Security," Feb. 17, 2021 at https://www.sonarqube.org/, 3 pages.

* cited by examiner

FIG. 4

```
ResourceTable rt = new ResourceTable(getClass()
    .getClassLoader()
    .getResource("resource.table.info")
    .getFile());

for each resource r in rt:
    Handler h = Handlers.getHandler(r.type()); // e.g. file system
    h.run(r, r.usage_type()); // throws exception in case of error.
```

FIG. 6

RESOURCE VERIFICATION FOR AN APPLICATION

TECHNICAL FIELD

The presently disclosed subject matter relates, in general, to the field of computer software application installation, and more specifically, to resource verification for such applications.

BACKGROUND

A software application must typically be installed on a computer device before use. The installation procedure generally involves copying program data related to the application to an installed location on the computer device.

When executing the installed application on the host computer device, the application may need to access certain computing resources on the device in order to perform its functionality properly. Such computing resources can include, for example, hardware and/or software components of the computer device. Additionally or alternatively, the application may also need to interact with other applications and/or systems via communication protocols.

During the development lifecycle of the application, there are various environments where the application code is executed, such as, e.g., a development environment, a testing environment, a demo environment, and a customer environment, etc. As there are different types of topologies and configurations in different environments, there may be cases where certain resources exist in one environment, but are lacking in another. In some cases, some resources may even be lacking at the customer site which can prevent the application from properly executing in run time, thus causing a possible software rollback.

SUMMARY

In accordance with certain aspects of the presently disclosed subject matter, there is provided a computerized system of resource verification for an application, the system comprising a processing and memory circuitry (PMC) configured to: obtain, at a target environment, a checklist of resources required for running the application, wherein the checklist is generated by: obtain source code of the application and an executable file of the application; run the executable file, and monitor one or more resources accessed by the application during execution thereof and corresponding access type of each resource, giving rise to a first list of resources comprising the one or more resources each associated with the access type thereof; perform static code analysis of the source code including searching the source code for one or more specific code patterns indicative of respective resources to be accessed and corresponding access types thereof, and generating a second list of resources based on result of the code analysis; and map the first list and second list of resources to generate the checklist of resources; and automatically verify the checklist of resources at the target environment, giving rise to a verification result indicative of whether each resource in the checklist is accessible with the access type as required in the checklist.

In addition to the above features, the system according to this aspect of the presently disclosed subject matter can comprise one or more of features (i) to (x) listed below, in any desired combination or permutation which is technically possible:

(i). The checklist of resources can be previously generated in one or more environments different from the target environment.
(ii). The running the executable file can be performed in a test environment of the application.
(iii). The checklist of resources comprise one or more resources with respect to at least one of the following: Input/Output usage, memory, registry, storage, operating system (OS) configuration, network configuration, and external resources with respect to other entities operatively connected thereto.
(iv). The monitoring is performed by using a system monitoring tool.
(v). The static code analysis is performed in a development environment of the application.
(vi). The mapping comprises comparing the resources in the first list and the second list, and integrating non-duplicated resources of the two lists to generate the checklist of resources.
(vii). The PMC is further configured to install the application in response to a positive verification result indicating all resources in the checklist are successfully verified.
(viii). The PMC is further configured to provide an error message in response to a negative verification result indicating that at least one resource in the checklist is missing and/or at least one access type associated with at least one resource item in the checklist is not correct.
(ix). The application is configured for examination of a semiconductor specimen, and is selected from a group comprising: automated defect review, automated defect classification, automated defect detection, automated segmentation of specimen images, and automated metrology based on specimen images.
(x). The PMC is further configured to generate the checklist of resources including said obtaining source code and executable file, running the executable file, performing static code analysis, and mapping.

In accordance with other aspects of the presently disclosed subject matter, there is provided a method of resource verification for an application, the method performed by a processing and memory circuitry (PMC) and comprising: obtaining, at a target environment, a checklist of resources required for running the application, wherein the checklist is generated by: obtaining source code of the application and an executable file of the application; running the executable file, and monitoring one or more resources accessed by the application during execution thereof and corresponding access type of each resource, giving rise to a first list of resources comprising the one or more resources each associated with the access type thereof; performing static code analysis of the source code including searching the source code for one or more specific code patterns indicative of respective resources to be accessed and corresponding access types thereof, and generating a second list of resources based on result of the code analysis; and mapping the first list and second list of resources to generate the checklist of resources; and automatically verifying the checklist of resources at the target environment, giving rise to a verification result indicative of whether each resource in the checklist is accessible with the access type as required in the checklist.

This aspect of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of resource verification for an application, the method comprising: obtaining, at a target environment, a checklist of resources required for running the application, wherein the checklist is generated by: obtaining source code of the application and an executable file of the application; running the executable file, and monitoring one or more resources accessed by the application during execution thereof and corresponding access type of each resource, giving rise to a first list of resources comprising the one or more resources each associated with the access type thereof; performing static code analysis of the source code including searching the source code for one or more specific code patterns indicative of respective resources to be accessed and corresponding access types thereof, and generating a second list of resources based on result of the code analysis; and mapping the first list and second list of resources to generate the checklist of resources; and automatically verifying the checklist of resources at the target environment, giving rise to a verification result indicative of whether each resource in the checklist is accessible with the access type as required in the checklist.

This aspect of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a method of generating a checklist of resources required for running an application, the method performed by a processing and memory circuitry (PMC) and comprising: obtaining source code of the application and an executable file of the application; running the executable file, and monitoring one or more resources accessed by the application during execution thereof and corresponding access type of each resource, giving rise to a first list of resources comprising the one or more resources each associated with the access type thereof; performing static code analysis of the source code including searching the source code for one or more specific code patterns indicative of respective resources to be accessed and corresponding access types thereof, and generating a second list of resources based on result of the code analysis; and mapping the first list and second list of resources to generate the checklist of resources, wherein the checklist is usable for verifying the accessibility of the resources in the checklist prior to installing the application.

This aspect of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of generating a checklist of resources required for running an application, the method comprising: obtaining source code of the application and an executable file of the application; running the executable file, and monitoring one or more resources accessed by the application during execution thereof and corresponding access type of each resource, giving rise to a first list of resources comprising the one or more resources each associated with the access type thereof; performing static code analysis of the source code including searching the source code for one or more specific code patterns indicative of respective resources to be accessed and corresponding access types thereof, and generating a second list of resources based on result of the code analysis; and mapping the first list and second list of resources to generate the checklist of resources, wherein the checklist is usable for verifying the accessibility of the resources in the checklist prior to installing the application.

This aspect of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a method of installing an application, the method performed by a processing and memory circuitry (PMC) and comprising: receiving, at a target environment, an application package including: the application to be installed at the target environment, an installer program usable for installing the application, a verification utility attached to the installer program and configured to verify, prior to installation of the application, one or more resources required for running the application, wherein the verification utility includes: a checklist of resources which includes the one or more resources each associated with an access type thereof, and a verification program including a set of verification instructions capable of verifying accessibility of each resource in the checklist of resources; executing the verification program at the target environment to obtain a verification result indicative of whether each resource in the checklist is accessible with the access type as required in the checklist; and installing the application using the installer program in response to a positive verification result indicating all resources in the checklist are successfully verified.

This aspect of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of installing an application, the method comprising: receiving, at a target environment, an application package including: the application to be installed at the target environment, an installer program usable for installing the application, a verification utility attached to the installer program and configured to verify, prior to installation of the application, one or more resources required for running the application, wherein the verification utility includes: a checklist of resources which includes the one or more resources each associated with an access type thereof, and a verification program including a set of verification instructions capable of verifying accessibility of each resource in the checklist of resources; executing the verification program at the target environment to obtain a verification result indicative of whether each resource in the checklist is accessible with the access type as required in the checklist; and installing the application using the installer program in response to a positive verification result indicating all resources in the checklist are successfully verified.

This aspect of the disclosed subject matter can comprise one or more of features (i) to (x) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 4 illustrates an exemplary screen copy of a system performance monitor in accordance with certain embodiments of the presently disclosed subject matter.

FIG. 6 illustrates an example of a snippet of verification code in accordance with certain embodiments of the presently disclosed subject matter.

DETAILED DESCRIPTION OF EMBODIMENTS

Figure 1A:
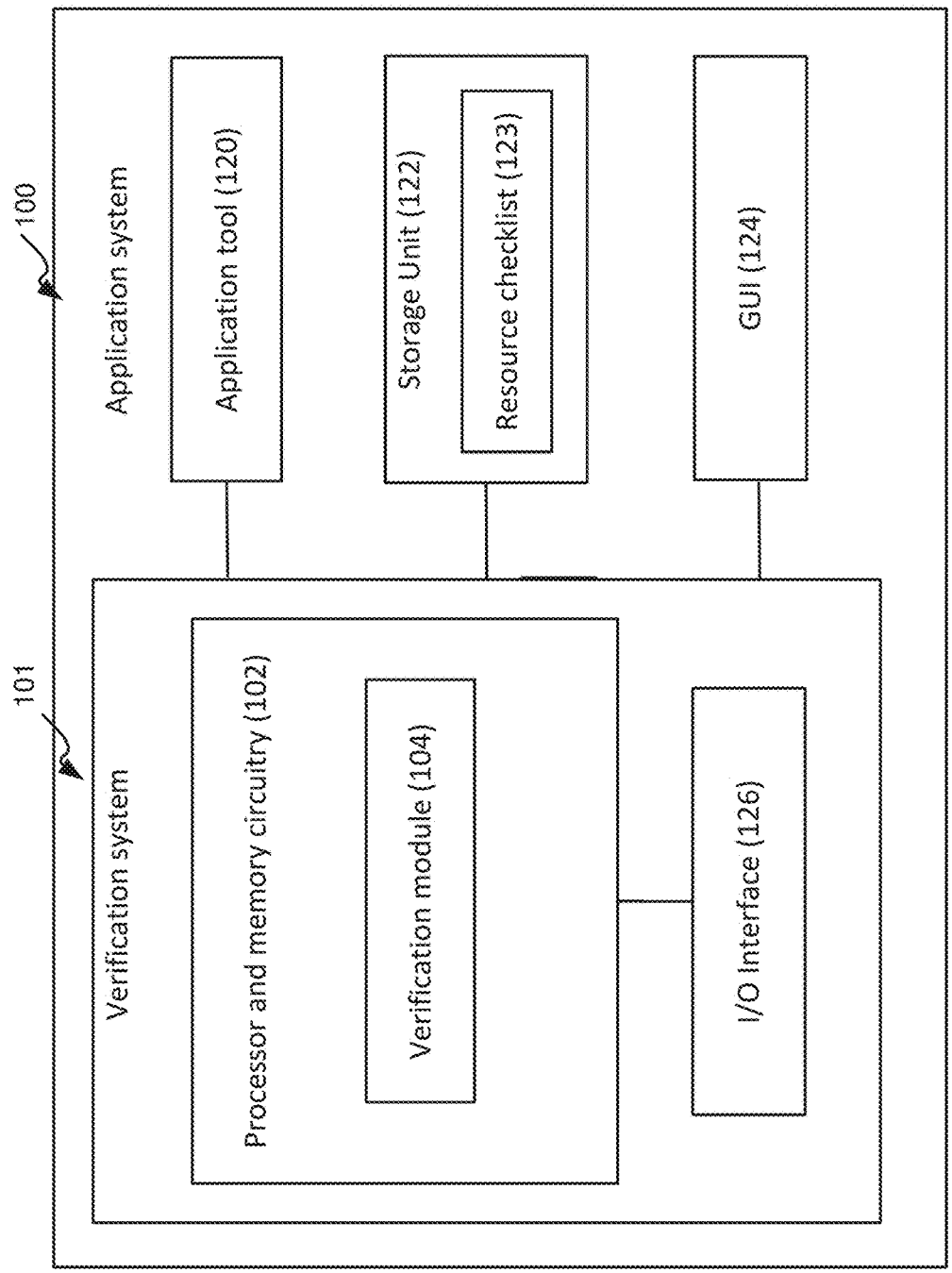
FIG. 1A illustrates a functional block diagram of an application system comprising a verification sub-system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "verifying", "obtaining", "running", "performing", "monitoring", "searching", "mapping", "comparing", "integrating", "installing", "providing", "executing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the application system, the verification system, the installation system, the resource checklist generation system and respective parts thereof disclosed in the present application.

The term "examination" used in this specification should be expansively construed to cover any kind of metrology-related operations, as well as operations related to detection and/or classification of defects in a specimen during its fabrication. Examination is provided by using non-destructive examination tools during or after manufacture of the specimen to be examined. By way of non-limiting example, the examination process can include one or more of the following operations: runtime scanning (in a single or in multiple scans), sampling, reviewing, measuring, classifying and/or other operations provided with regard to the specimen or parts thereof, using the same or different examination tools. Likewise, examination can be provided prior to manufacture of the specimen to be examined, and can include, for example, generating an examination recipe(s) and/or other setup operations. It is noted that, unless specifically stated otherwise, the term "examination", or its derivatives used in this specification, is not limited with respect to resolution or size of an inspection area. A variety of non-destructive examination tools includes, by way of non-limiting example, scanning electron microscopes, atomic force microscopes, optical inspection tools, etc.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1A illustrating a functional block diagram of an application system comprising a verification sub-system in accordance with certain embodiments of the presently disclosed subject matter.

The application system 100 illustrated in FIG. 1A refers to a computer-based system at a target environment where an application is to be installed and where the installed application, upon execution, is configured to perform application-specific functionalities. The terms "application", "software application", and "application program" are used interchangeably in the present disclosure to refer to a computing program designed to carry out one or more specific tasks or functionalities typically used by end-users. The target environment can be, e.g., a production/runtime environment at customer/end-user site. Depending on the functionality for which it was designed, an application can be configured to process and manipulate different objects, such as, e.g., text, numbers, media (e.g., audio and/or video), graphics (e.g., images, photos), and a combination of these elements. Some applications may focus on a single task, such as, e.g., word processing, while others may include several integrated functionalities. The application system 100 can comprise a host computer device for the application to be installed and executed.

As aforementioned, when executing an application installed on a host computer device, the application may need to access necessary computing resources with respect to the host computer device in order to perform its functionality properly. Such computing resources can include, for example, hardware and/or software components of the computer device and/or other applications and/or other systems operatively connected thereto.

An application is typically tested in a testing environment and afterwards installed and executed in a production environment. As there are different types of topologies and configurations in different environments, there may be cases where certain required resources for the application to run exist in the testing environment, but are lacking in the production environment. In such cases, it can prevent the application from properly executing in run time, thus causing a possible software rollback.

To address such a problem, efforts have been made in an attempt to mimic the production environment at the test environment, or configuring a virtual machine (VM) container according to the production environment, and executing the application in the container. These measures, in some cases, can be very difficult to realize. For example, it is very difficult to cover all use cases during in-house testing, which would require very heavy investment. On the other hand, implementing VM in some cases may not work in complicated situations such as, e.g., certain large-scale applications related to specific fields, such as, e.g., semiconductor examination.

Efforts have also been made to create a checklist of resources, including all necessary resources required for an application to run. Conventionally, such a checklist is created manually by an application expert, such as, e.g., an application engineer, quality assurance personnel, etc. The manually-created checklist, in some cases, can be incomplete and error-prone, since even an expert may not be aware of all required resources. For instance, he/she may not be familiar with the codebase of the application, and thus inadvertently neglects some resources. In addition, such a checklist is normally created and tested in the testing environment, which, as mentioned above, may have different available resources/configurations with respect to the production environment, thus further complicating the issue. Therefore, even if a checklist has been tested and verified in the production environment, it is not guaranteed that the application will work properly after installation.

For instance, assume an application actually requires access to two resources in order to run properly: drive C and drive D. However, the manually-created checklist is somehow incomplete, and only includes drive C. The testing environment comprises the two drives, and thus passes verification of the checklist. The production environment at the customer site, although only including drive C, still passes verification of the checklist without knowing that the checklist is incomplete. The application, once installed in such a production environment, will unavoidably run into problems. Therefore, an incomplete or erroneous list generated as such may cause software rollback and/or tool downtime, which may result in significant losses for customers.

According to certain embodiments of the presently disclosed subject matter, there is proposed a method and system for automatically verifying the resources required for a software application to execute in runtime, which can effectively prevent the above-mentioned issues. Such a system is also referred to herein as a verification system.

According to certain embodiments, system 100 comprises a computer-based sub-system 101 implemented as such a verification system. The verification system 101 can reside at a target environment (where the application is to be installed), such as, e.g., a production environment at a customer site. As illustrated in FIG. 1A, system 101 includes a processor and memory circuitry (PMC) 102 operatively connected to a hardware-based I/O interface 126. PMC 102 is configured to provide processing necessary for operating the system as further detailed with reference to FIG. 2A, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

According to certain embodiments, PMC 102 can include a verification module 104. The PMC 102 can be configured to obtain, via I/O interface 126, a checklist of resources required for running the application. By way of example, the checklist can be pre-stored in a storage unit 122 (e.g., illustrated as resource checklist 123) and acquired therefrom. Alternatively, the checklist can be received from an external data repository (e.g., a remote data center) or external storage medium (e.g., a portable disk). The checklist of resources can comprise resources each associated with the access type required thereof, and can be previously generated by a checklist generation system and method, as described in further detail with reference to FIG. 1C and FIG. 3.

The verification module 104 can be configured to automatically verify the checklist of resources at the target environment, giving rise to a verification result indicative of whether each resource in the checklist is accessible with an access type as required in the checklist.

Operations of system 101, PMC 102 and the functional modules therein, will be further detailed with reference to FIG. 2A.

In some embodiments, an application can be designed to be installed on a designated apparatus/tool so as to integrate and enhance the tool's functionality. For purpose of illustration, such a tool is referred herein to as an application tool (e.g., the application tool 120 as illustrated in FIG. 1A).

According to certain embodiments, an application can be specifically designed for the needs of semiconductor examination. By way of example, the application tool 120 can be an examination tool capable of examination of a semiconductor specimen (e.g., of a wafer and/or parts thereof) as part of the specimen fabrication process. The examination referred to herein can be construed to cover any kind of operations related to detection and/or classification of defects and/or metrology-related operations in a specimen during its fabrication. Such examination functionalities can be realized (at least partially) by the application being installed on the tool. By way of example, the application can be selected from a group comprising: automatic defect detection, Automatic Defect Review (ADR), Automatic Defect Classification (ADC), automatic segmentation, and automatic metrology based on specimen images.

System 101 can be operatively connected to one or more application tools (e.g., examination tools) configured to scan a semiconductor specimen and capture frames/images thereof for examination of the specimen. The term "examination tool(s)" used herein should be expansively construed to cover any tools that can be used in examination-related processes, including, by way of non-limiting example, imaging, scanning (in a single or in multiple scans), sampling, reviewing, measuring, classifying and/or other processes provided with regard to the specimen or parts thereof.

By way of example, a specimen can be examined by one or more low-resolution examination tools (e.g., an optical inspection system, low-resolution SEM, etc.). The resulting data (referred to as low-resolution image data), informative of low-resolution images of the specimen, can be used by the application for examining the specimen (e.g., for defect detection). Alternatively or additionally, the specimen can be examined by a high-resolution tool (e.g., a Scanning Electron Microscope (SEM) or Atomic Force Microscopy (AFM) or Transmission Electron Microscope (TEM)). The resulting data (referred to as high-resolution image data), informative of high-resolution images of the specimen, can be used by the application for examining the specimen (e.g., defect review and/or classification). In some cases, the same examination tool can provide low-resolution image data and high-resolution image data.

According to certain embodiments, system 100 can comprise a storage unit 122. The storage unit 122 can be configured to store any data necessary for operating system 101, and/or data for operating the application to be installed, and/or data for operating the application tool 120, including, such as, e.g., data related to input and output, as well as intermediate processing results of such systems and/or application. By way of example, the storage unit 122 can be configured to store the checklist of resources, and/or images produced by the examination tool and/or derivatives thereof, and/or application output indicative of examination results of the specimen, etc. For instance, the checklist can be retrieved from the storage unit 122 and provided to the PMC 102 for further processing.

In some embodiments, system 100 can optionally comprise a computer-based Graphical User Interface (GUI) 124 which is configured to enable user-specified inputs related to system 101 and/or the application. The user may be provided, through the GUI, with options of defining certain operation parameters. In some cases, the user may also view operation results. For instance, the user can be presented with the checklist of resources, and/or the verification result. In the case of a semiconductor-specific application as mentioned above, a visual representation of the semiconductor specimen (for example, by a display forming part of GUI 124), and/or examination results (e.g., measurements on the specimen), can be presented on the GUI.

Figure 1B:
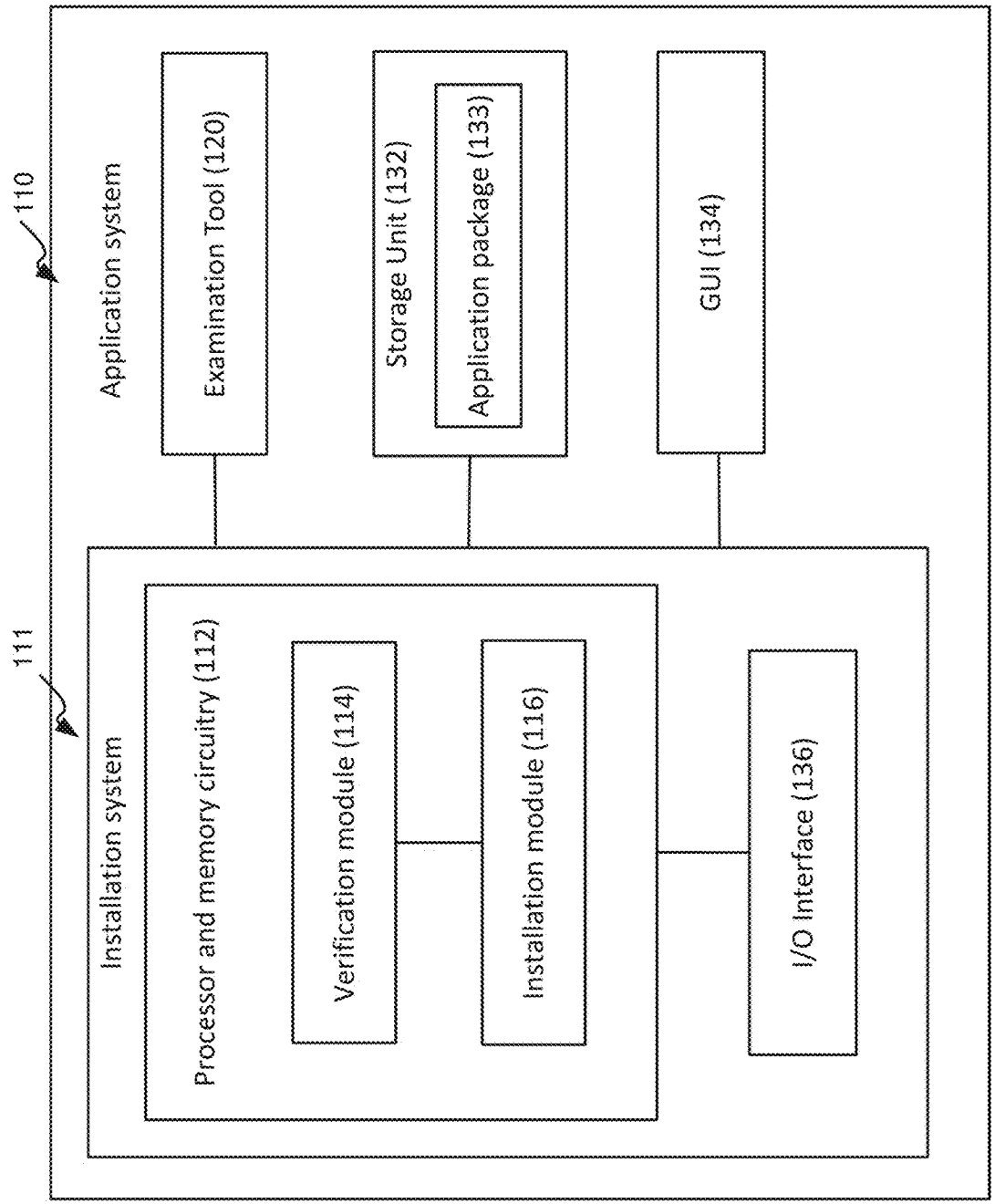
FIG. 1B illustrates a functional block diagram of an application system comprising an installation sub-system in accordance with certain embodiments of the presently disclosed subject matter.

Turning now to FIG. 1B, there is illustrated a functional block diagram of an application system comprising an installation sub-system in accordance with certain embodiments of the presently disclosed subject matter.

The application system 110 as illustrated in FIG. 1B is similar to the application system 100 as described above with reference to FIG. 1A, and refers to a computer-based system at a target environment where an application is to be installed and where the installed application, upon execution, is configured to perform application-specific functionalities.

According to certain embodiments, system 110 comprises a computer-based sub-system 111 implemented as an installation system. The installation system 111 is configured to install the application at a target environment, such as, e.g., a production environment at a customer site. As illustrated in FIG. 1B, system 111 includes a processor and memory circuitry (PMC) 112 operatively connected to a hardware-based I/O interface 136. PMC 112 is configured to provide processing necessary for operating the system as further detailed with reference to FIG. 2B, and comprises a processor (not shown separately) and a memory (not shown separately). The processor of PMC 112 can be configured to execute several functional modules in accordance with computer-readable instructions implemented on a non-transitory computer-readable memory comprised in the PMC. Such functional modules are referred to hereinafter as comprised in the PMC.

According to certain embodiments, PMC 112 can include a verification module 114 and an installation module 116. The PMC 112 can be configured to obtain, via I/O interface 136, an application package including: the application to be installed at the target environment, an installer program usable for installing the application, a verification utility attached to the installer program and configured to verify, prior to installation of the application, one or more resources required for running the application. The verification utility can include: a checklist of resources which includes the one or more resources each associated with an access type thereof, and a verification program including a set of verification instructions capable of verifying accessibility of each resource in the checklist of resources. By way of example, the application package can be pre-stored in a storage unit 132 (illustrated as application package 133) and acquired therefrom. Alternatively, the application package can be received from an external data repository or external storage medium. As aforementioned, the checklist of resources can be previously generated by a checklist generation system and method, as described in further detail with reference to FIG. 1C and FIG. 3.

The verification module 114 can be configured to execute the verification program at the target environment to obtain a verification result indicative of whether each resource in the checklist is accessible with the access type as required in the checklist. The installation module 116 can be configured to install the application using the installer program in response to a positive verification result.

As aforementioned, in some cases, the application can be installed on an application tool 120 as described above, and system 111 can be operatively connected to the application tool 120 for facilitating the installation process of the application.

Similarly, system 110 can comprise a storage unit 132 configured to store any data necessary for operating system 111 (e.g., the application package 133), and/or data for operating the application to be installed, and/or data for operating the application tool 120. System 100 can optionally comprise a GUI 134 configured to enable user-specified inputs and presence of operation results related to system 111 and/or the application.

Operations of system 111, PMC 112 and the functional modules therein, will be further detailed with reference to FIG. 2B.

Figure 1C:
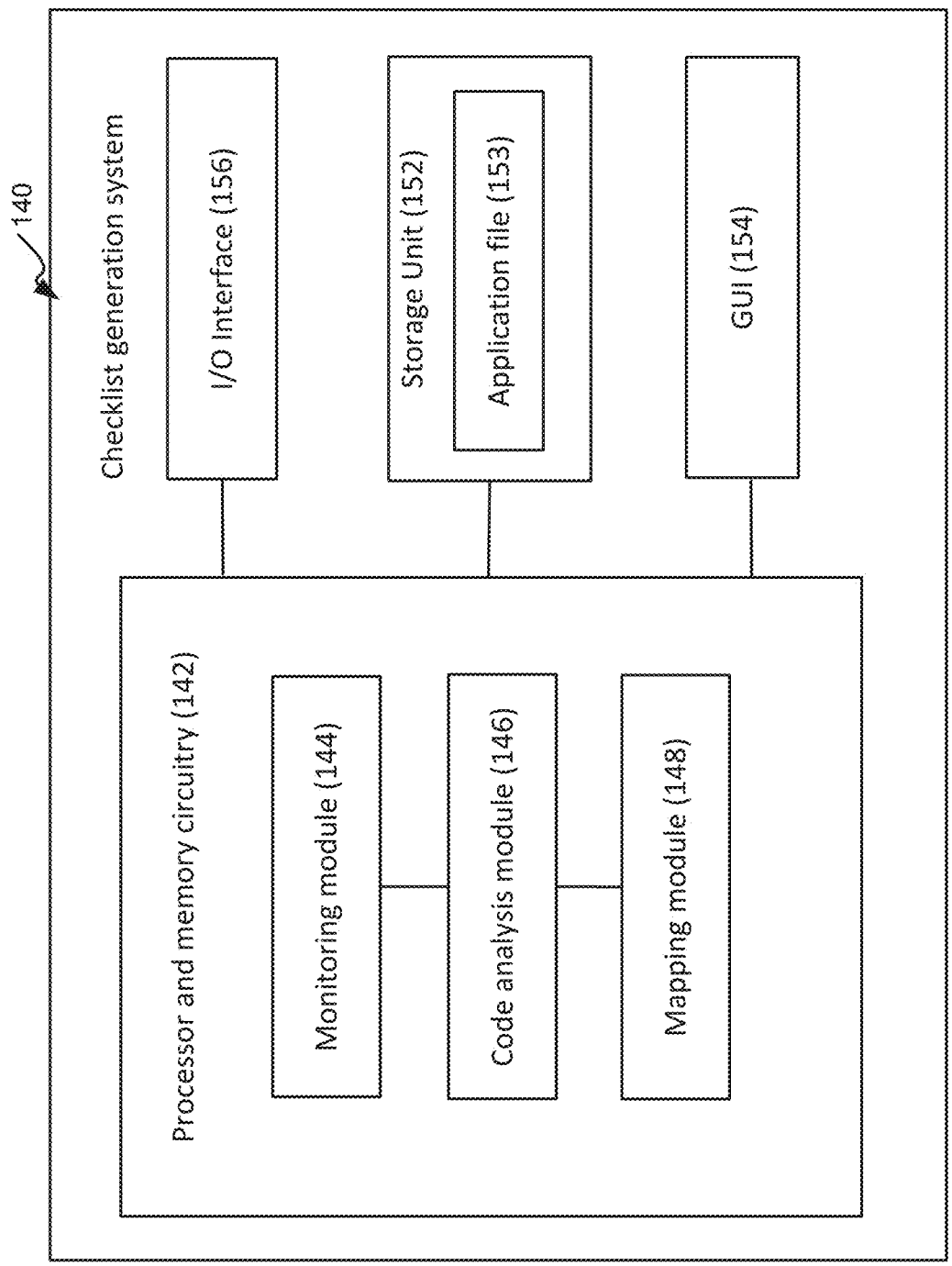
FIG. 1C illustrates a functional block diagram of a resource checklist generation system in accordance with certain embodiments of the presently disclosed subject matter.

Referring now to FIG. 1C, there is illustrated a functional block diagram of a resource checklist generation system in accordance with certain embodiments of the presently disclosed subject matter.

The resource checklist generation system 140 as illustrated in FIG. 1C refers to a computer-based system configured to generate a checklist of resources required for running an application. Typically, in some cases, the generation system 140 can be implemented at an environment different from the target environment where an application is to be installed.

According to certain embodiments, system 140 comprises a processor and memory circuitry (PMC) 142 operatively connected to a hardware-based I/O interface 156. PMC 142 is configured to provide processing necessary for operating the system as further detailed with reference to FIG. 3, and comprises a processor (not shown separately) and a memory (not shown separately). The processor of PMC 142 can be configured to execute several functional modules in accordance with computer-readable instructions implemented on a non-transitory computer-readable memory comprised in the PMC. Such functional modules are referred to hereinafter as comprised in the PMC.

According to certain embodiments, PMC 142 can include a monitoring module 144, a code analysis module 146 and a mapping module 148. The PMC 112 can be configured to obtain, via I/O interface 156, application files including source code of the application and an executable file of the application. By way of example, the application files can be pre-stored in a storage unit 152 (illustrated as application file 153) and acquired therefrom. Alternatively, the application file can be received from an external data repository or external storage medium. As aforementioned, the checklist of resources as generated can be provided to the verification system as described with reference to FIG. 1A and the installation system as described with reference to FIG. 1C.

The monitoring module 144 can be configured to run the executable file, and monitor one or more resources accessed by the application during execution thereof and corresponding access type of each resource, giving rise to a first list of resources comprising the one or more resources each associated with the access type thereof.

The code analysis module 146 can be configured to perform static code analysis of the source code including searching the source code for one or more specific code patterns indicative of respective resources to be accessed and corresponding access types thereof, and can generate a second list of resources based on result(s) of the code analysis.

The mapping module 148 can be configured to map the first list and second list of resources to generate the checklist of resources. The checklist is usable for verifying the accessibility of the resources prior to installing the application.

Similarly, system 140 can comprise a storage unit 152 configured to store any data necessary for operating system 140 (e.g., the application files 153). System 140 can optionally comprise a GUI 154 configured to enable user-specified inputs and presence of operation results related to system 140.

Operations of system 140, PMC 142 and the functional modules therein, will be further detailed with reference to FIG. 3.

Those versed in the art will readily appreciate that the teachings of the presently disclosed subject matter are not bound by the systems illustrated in FIGS. 1A, 1B, and 1C; equivalent and/or modified functionality can be consolidated or divided in another manner, and can be implemented in any appropriate combination of software with firmware and/or hardware.

It is noted that the systems illustrated in FIGS. 1A, 1B, and 1C can be implemented in a distributed computing environment, in which the aforementioned functional modules as comprised in the PMC can be distributed over several local and/or remote devices, and can be linked through a communication network. It is further noted that in other embodiments at least some of the application tool(s), storage unit and/or GUI can be external to the systems and/or sub-systems illustrated in the figures, and can operate in data communication with the systems via an I/O interface.

It is to be noted that the application tool is optional, and the application can be installed in the application system with or without the tool. In some embodiments, the application can be designed to be installed on a corresponding application tool so as to integrate the functionality thereof with the tool, thereby facilitating and enhancing the functionalities of the tools.

Figure 2A:
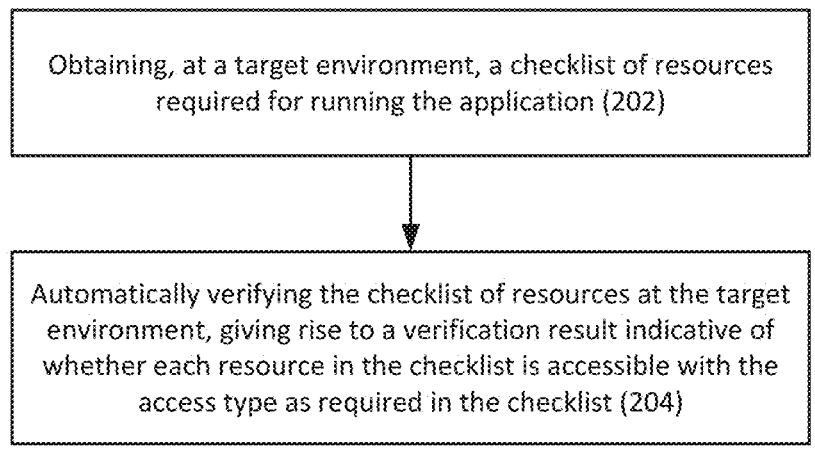
FIG. 2A illustrates a generalized flowchart of resource verification for an application in accordance with certain embodiments of the presently disclosed subject matter.

Referring to FIG. 2A, there is illustrated a generalized flowchart of resource verification for an application in accordance with certain embodiments of the presently disclosed subject matter.

As described above, according to certain embodiments of the presently disclosed subject matter, there is proposed a method of automatically verifying, prior to installation of an application, the resources required for the application to properly execute and perform its functionality in runtime, which may effectively prevent possible software failure and rollback at a target environment. In particular, the proposed method utilizes a checklist of resources, which are automatically generated in advance using a dedicated generation methodology, thus effectively avoiding suffering from the shortcomings with respect to the manually-generated checklist which may be incomplete and error-prone.

Specifically, a checklist of resources required for running the application can be obtained (202) (e.g., by the PMC 102 via I/O interface 126) at a target environment. The target environment refers to a destination environment where the application is intended to be installed. By way of example, the target environment can be a production environment at a customer site. According to certain embodiments, the checklist of resources can comprise one or more resources that are accessed for transferring data to and/or from the application (such as, e.g., I/O operations, or read/write operations) during the execution thereof. By way of example, the resources can be related to at least one of the following types: memory, registry, storage, operating system (OS) configuration, network configuration, and external resource(s) with respect to other entities (e.g., other applications or systems) operatively connected thereto.

According to certain embodiments, the checklist of resources can be previously generated in one or more environments different from the target environment, using a generation method as described with reference to FIG. 3. By way of example, the generation method can be performed by the resource checklist generation system 140 (e.g., by PMC 142) as illustrated in FIG. 1C.

Figure 3:
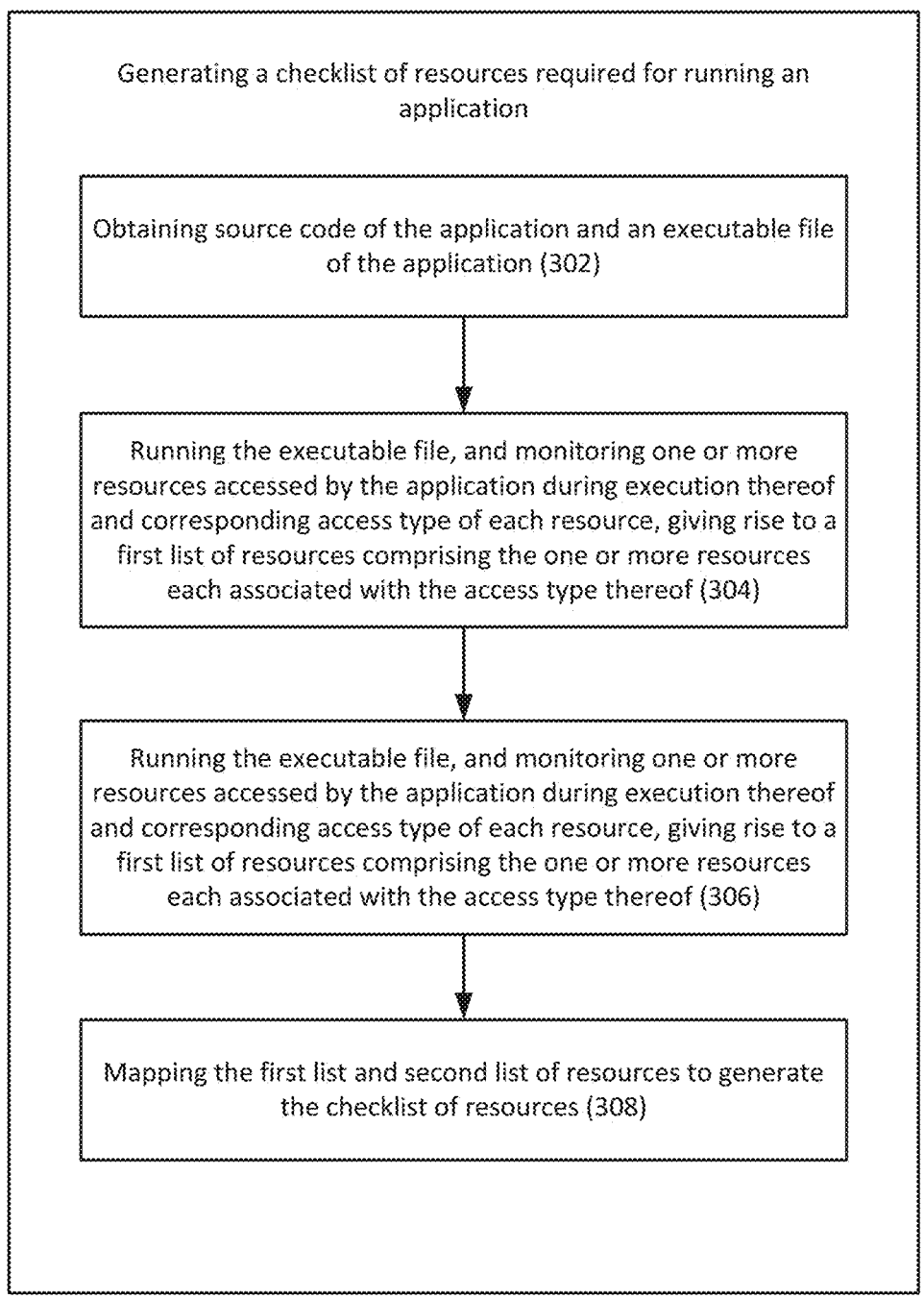
FIG. 3 illustrates a generalized flowchart of generating a checklist of resources in accordance with certain embodiments of the presently disclosed subject matter.

Specifically, as illustrated in FIG. 3, source code of the application and an executable file of the application can be obtained (302). Source code generally refers to a collection of code written using a human-readable programming language to specify the actions to be performed by a computer. The source code can be often transformed by an assembler or compiler into an executable machine code file that can be executed by the computer, which is referred to as an executable file or executable code/program. Such an application file/code can be typically obtained from a development environment of the application.

The PMC can run (304) the executable file, and monitor one or more resources accessed/utilized by the application during execution thereof and the corresponding access type of each resource, giving rise to a first list of resources comprising the one or more resources each associated with the access type thereof. In some embodiments, the executable file can be executed and monitored in a test environment of the application. By way of example, the monitoring can be performed using a system monitoring tool to capture all I/O resources that are accessed during execution of the application. One example of such a tool is the Windows performance monitor, a tool that can be used to monitor real-time system performance and examine how applications affect computer performance.

Figure 4:
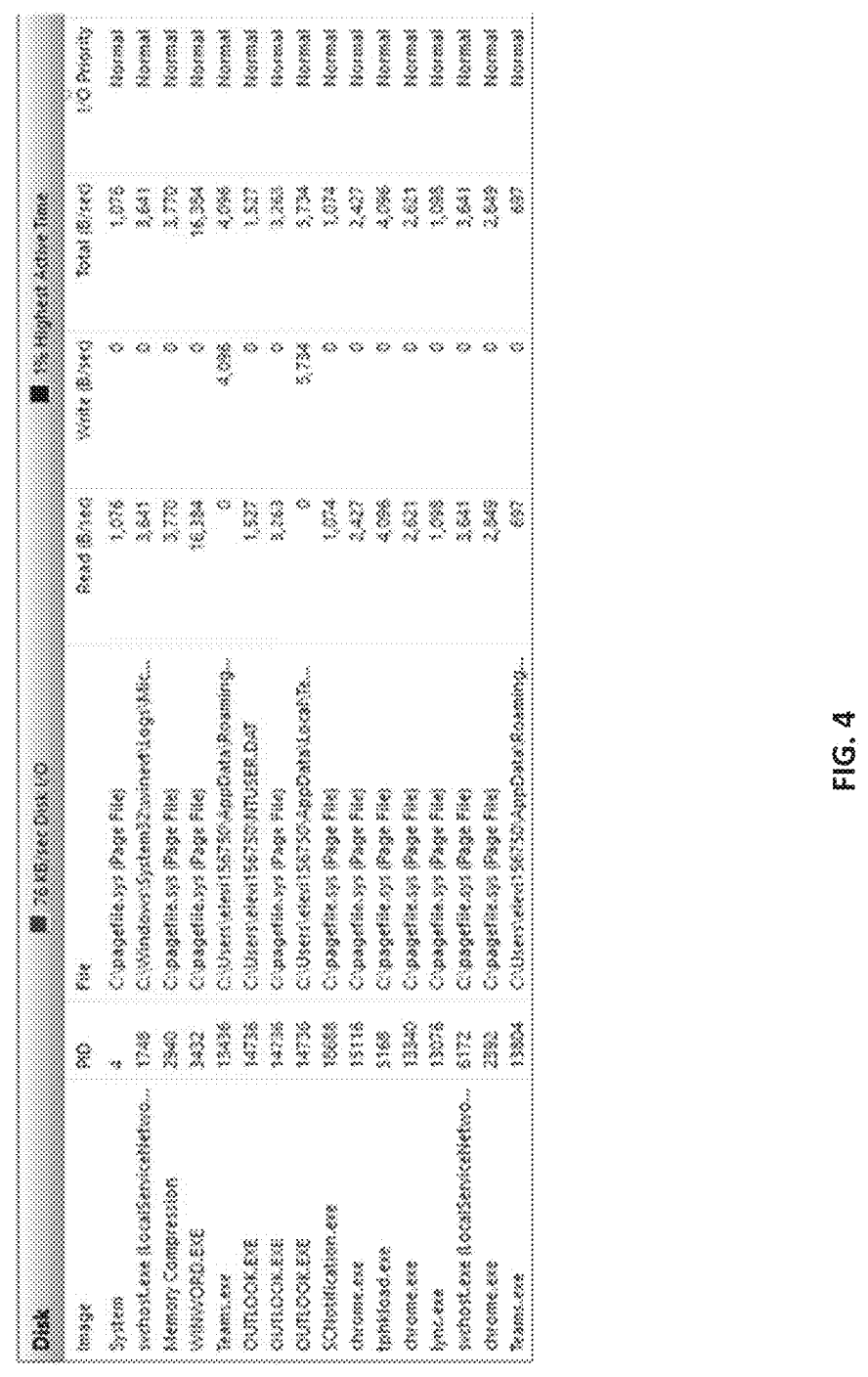

FIG. 4 illustrates an exemplary screen copy of a system performance monitor that captures all disk-related I/O while an application is executed, in accordance with certain embodiments of the presently disclosed subject matter.

As shown, the monitor can also indicate the access type (e.g., read/write) of different files in different disks. Different monitoring tools can be used in accordance with different types of applications. In some cases, a user-customized tool can be used instead of existing tools.

Figure 5:
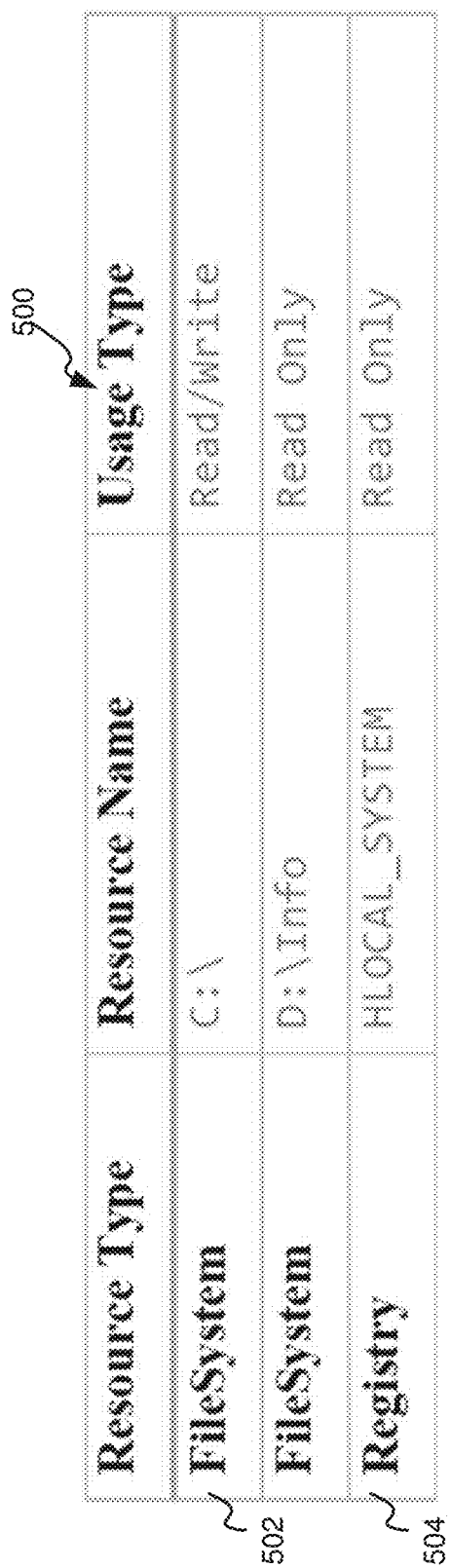
FIG. 5 illustrates an example of a first list of resources in accordance with certain embodiments of the presently disclosed subject matter.

A list of resources that are accessed can be extracted from the monitoring tool comprising the resources and the access type associated therewith (i.e., the first list of resources as described above). FIG. 5 illustrates an example of a first list of resources in accordance with certain embodiments of the presently disclosed subject matter. As shown, each row of the table 500 in FIG. 5 represents a resource that was accessed/utilized during the monitoring process. For instance, the first resource 502 is related to the resource type of FileSystem and the specific resource name is C drive: "C:\". The access/usage type associated with this resource is both read and write access. For another example, the third resource 504 in the table is related to the resource type of "Registry" and the resource name is "HLOCAL_SYSTEM". The access/usage type associated with this resource is read-only access.

It is to be noted that although the first list of resources are illustrated in FIG. 5 in the format/structure of a table, this is for exemplary purpose only, and is not intended to limit the present disclosure in any way. Any other suitable data representation of the list can be used in lieu of the above.

Continuing with the description of FIG. 3, static code analysis of the source code can be performed (306) including searching the source code for one or more specific code patterns indicative of respective resources to be accessed and corresponding access types thereof, and generating a second list of resources based on the result of the code analysis.

Static code analysis, also termed as static program analysis, refers to the analysis of a computer program that is performed without actually executing the program, in contrast to dynamic analysis. The code analysis is usually performed during software development, on some version of the source code. Conventionally, code analysis is usually used for the purpose of software inspection and code review. The present disclosure utilizes this technique for a different purpose, i.e., to search and create a list of resources required for running the application.

According to certain embodiments, specifically, static code analysis scans the code base, and searches for specific code patterns indicative of resource access. By way of example, a specific code pattern to be searched for can include a "new file" operation which indicates that a new file will be created in a specific storage location. The associated access type to the storage location is thus write access. It is to be noted that the specific code pattern in different programing languages can be different. For instance, in the above example, the specific code can be written in Java, as exemplified below:

File file=new File("C:\\demo\\demofile.txt").

Alternatively, it can be written in Python, as exemplified below:

f=open("demofile.txt", "r")].

By way of another example, another specific code pattern to be searched for can include "readString" or "OpenKey" which indicates read access to registry items. For instance, the specific code can be written in Java, as exemplified below:

String value=WinRegistry.readString (WinRegistry, "SOFTWARE\\Microsoft\\Windows NT\\CurrentVersion").

Alternatively, the code can be written in Python, as exemplified below:

access_key=winreg.OpenKey (access_registry, r"SOFTWARE\Microsoft\Windows\CurrentVersion").

The first list of resources as generated with respect to block 304 and the second list of resources as generated with respect to block 306 can be mapped (308) to generate the checklist of resources. By way of example, the mapping between the two lists can be performed by comparing the resource items of the two lists, for any duplicated/common resource (i.e., the resource appears in both lists), removing it from one of the two lists, and integrating the remaining non-duplicated resource items into a combined list, i.e., the checklist of resources. In some cases, for a given duplicated resource item, the access type thereof in the two lists may be different. For instance, a specific resource can be associated with read-only access in one list, while in the other list it is associated with write access. In such cases, such a resource item will be associated with both read and write access in the combined list.

It is to be noted that the two stages of the extraction process of resource items are complementary to each other. By combining resource items extracted based on runtime execution data (i.e., by monitoring during runtime execution of the application with respect to block 304) as well as resource items extracted based on static code data (i.e., by static code analysis with respect to block 306), the checklist as generated is expected to have higher level completeness and accuracy.

By way of example, although the monitoring process can reflect all resources that are accessed during the test execution of the application, it is possible that a certain branch or part of the system flow/functionalities of the application may not be executed during the test. Therefore, the static code analysis can supplement the list in this regard and provide a fuller picture of required resources, as indicated by the source code.

On the other hand, there are also cases where the static code analysis may not be able to disclose certain resource items, which, only upon execution, can be revealed. By way of example, identifiers of certain resource items may not be readily available in the code itself, but rather stored in a location which is not immediately accessible during static code analysis. For instance, certain code may aim to access a file whose name or location is stored in a database. In such cases, static code analysis will not be able to identify the file. Only in runtime, when actually accessing the database, it can be determined which file it is, and/or the location thereof.

Having described above the generation process of the checklist of resources, attention is directed back to FIG. 2A, where the checklist of resources is automatically verified (204) (e.g., by the verification module 104) at the target environment, giving rise to a verification result indicative of whether each resource in the checklist is accessible with the access type as required in the checklist.

In some embodiments, the verification can be performed using a verification program including a set of verification instructions (e.g., a set of verification codes) received together with the checklist of resources. An example of a snippet of verification code is illustrated in FIG. 6 in accordance with certain embodiments of the presently disclosed subject matter.

As shown, the verification code first loads the checklist of resources (e.g., Resource Table rt as exemplified in FIG. 6), and for each resource item r in the resource table rt, retrieves the resource type of the resource item from the table and uses a handler (which generally allows to send and process message and runnable objects) which is specific to handle such resource type, to query the resource item by calling its running method to verify whether the resource item can be accessed with such an access type. If the resource item can be accessed with the correct access type, the resource item is successfully verified. Otherwise, an error message will be output.

Once all the resource items in the checklist have been verified, a verification result of the checklist can be provided. The verification result can be indicative of whether each resource in the checklist is accessible with the access type as required in the checklist. By way of example, the verification result can be presented in a similar form as the checklist with additional information with respect to the verification outcome of each resource item.

In cases where a positive verification result indicating all the resource items in the checklist are successfully verified is provided, the application can be installed in the target environment. In some other cases, a negative verification result can be provided, indicating that at least one resource in the checklist is missing, and/or at least one access type associated with at least one resource item in the checklist is not correct. In such cases, an error message can be provided to the customer informative of the at least one missing resource item and/or the incorrect access type of the at least one resource item. Installation of the application should be paused/postponed, until the above-described error is fixed and the verification process is successful.

Figure 2B:
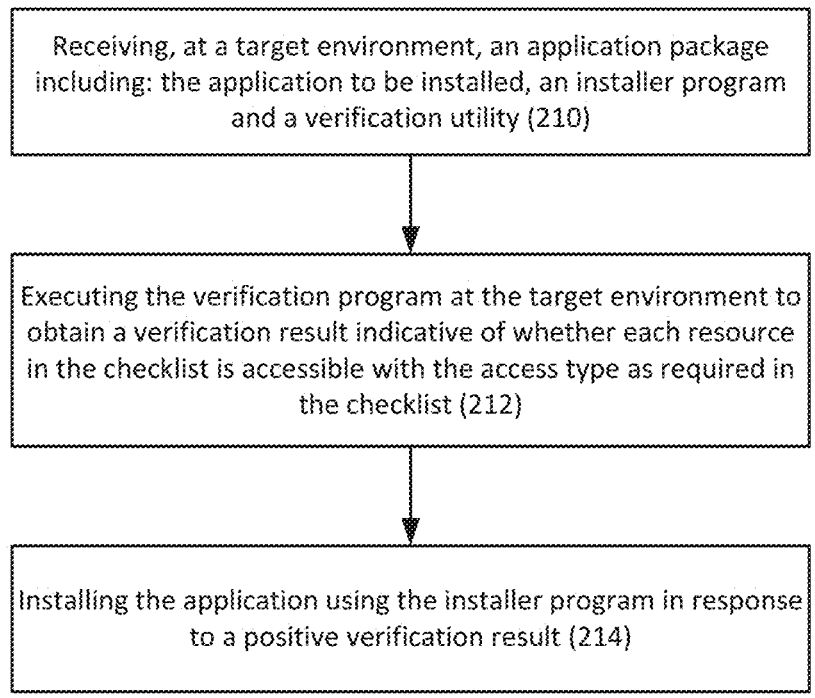
FIG. 2B illustrates a generalized flowchart of installing an application in accordance with certain embodiments of the presently disclosed subject matter.

Turning now to FIG. 2B, there is illustrated a generalized flowchart of installing an application in accordance with certain embodiments of the presently disclosed subject matter.

An application package can be received (210) (e.g., by the PMC 112 of FIG. 1B) at a target environment. The application package can include: the application to be installed at the target environment, an installer program usable for installing the application, and a verification utility attached to the installer program and configured to verify, prior to installation of the application, one or more resources required for running the application. The verification utility can include: a checklist of resources which includes the one or more resources each associated with the access type thereof, and a verification program including a set of verification instructions capable of verifying accessibility of each resource in the checklist of resources.

By way of example, the application package can be provided by the application vendor for the purpose of installing the application at the target environment (e.g., a production environment at a customer site). For instance, the application package and its components can be stored in a computer-readable storage medium, such as, e.g., a portable disk, a Digital Versatile Disc (DVD) and any other types of suitable storage, in order to transmit the data to the target environment. In another example, the application package can be stored in a cloud-based data center which is communicatively connected to the target environment.

The installer program can be configured for administering and performing the installation procedure of the application. Generally, the installer program is unique to the application and is customized to install the program files from the source location to pre-configured locations on the computer system. When executed, the installer program installs the program files to the computer system, and creates entries in a system registration database (e.g., the "system registry"), which identify the locations of the program files on the computer system. After installation, the application generally queries the system registry for the path to an installed program file, and then accesses the installed program file to execute it.

The verification utility can be regarded as a utility software program designed to perform the verification of resources as required by the application in runtime. In some embodiments, the checklist of resources can be generated in accordance with the generation process as described with reference to FIG. 3. In one embodiment, the verification program can be implemented as a set of verification codes in a similar manner as exemplified in FIG. 6.

The verification program can be executed (212) (e.g., by the verification module 114 in FIG. 1B) at the target environment to obtain a verification result indicative of whether each resource in the checklist is accessible with the access type as required in the checklist. The application can be installed (214) (e.g., by the verification module 116 in FIG. 1B) using the installer program in response to a positive verification result indicating all resources in the checklist are successfully verified.

It is to be noted that examples illustrated in the present disclosure, such as, e.g., the verification code, the system monitoring tool, the specific code patterns indicative of respective resources to be accessed and corresponding access types thereof, etc., are illustrated for exemplary purposes, and should not be regarded as limiting the present disclosure in any way. Other examples can be used in addition to, or in lieu of the above.

It is to be noted that although it is described in some embodiments that the checklist of resources can be generated in an environment different from the target environment, such as, e.g., in the development and/or testing environment, this is not necessarily so. In some cases the generation process can be performed in the target environment, if the required application file and code can be obtained in such an environment. The present disclosure is not limited by the specific environment that the process is performed.

Among advantages of certain embodiments as described herein is to provide an automatic verification process to automatically verify, prior to installation of an application, the resources required for an application to properly execute and perform its functionality. Such a verification process may effectively prevent possible software failure and rollback at a target environment.

In particular, the proposed method utilizes a checklist of resources, which are automatically generated in advance using a dedicated generation methodology, thus effectively avoiding suffering from the shortcomings with respect to the manually generated checklist which can be oftentimes incomplete and error-prone.

Specifically, by combining resource items extracted based on runtime execution data (i.e., by monitoring during runtime execution of the application) as well as resource items extracted based on static code data (i.e., by static code analysis), the checklist as generated is expected to have higher level completeness and accuracy.

In some cases, the verification process can serve as part of the installation process of the application, or as a preliminary process of the installation, thus resulting in a more effective installation process with less software failure or rollback. This is enabled at least by providing an application package that includes a verification utility attached/bundled with the installer program and configured to perform the verification automatically prior to the installation.

The verification process and installation process have been proven to be highly effective especially with respect to applications related to complicated fields and technologies, such as, e.g., in the field of semiconductor examination.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized method of resource verification for an application, the method performed by a processing and memory circuitry (PMC) and comprising:
    obtaining, at a target environment, a checklist of resources required for running the application, wherein the checklist is generated by:
        obtaining source code of the application and an executable file of the application;
        running the executable file, and monitoring one or more resources accessed by the application during execution thereof and corresponding access type of each resource, giving rise to a first list of resources comprising the one or more resources each associated with the access type thereof;
        performing static code analysis of the source code including searching the source code for one or more specific code patterns indicative of respective resources to be accessed and corresponding access types thereof, and generating a second list of resources based on result of the code analysis; and
        mapping the first list and second list of resources to generate the checklist of resources; and
    automatically verifying the checklist of resources at the target environment, giving rise to a verification result indicative of whether each resource in the checklist is accessible with the access type as required in the checklist.

2. The computerized method according to claim 1, wherein the checklist of resources is previously generated in one or more environments different from the target environment.

3. The computerized method according to claim 1, wherein the running the executable file is performed in a test environment of the application.

4. The computerized method according to claim 1, wherein the checklist of resources comprises one or more resources with respect to at least one of the following types: memory, registry, storage, operating system (OS) configuration, network configuration, and external resources with respect to other entities operatively connected thereto.

5. The computerized method according to claim 1, wherein the monitoring is performed by using a system monitoring tool.

6. The computerized method according to claim 1, wherein the static code analysis is performed in a development environment of the application.

7. The computerized method according to claim 1, wherein the mapping comprises comparing the resources in the first list and the second list, and integrating non-duplicated resources of the two lists to generate the checklist of resources.

8. The computerized method according to claim 1, further comprising installing the application in response to a positive verification result indicating that all resources in the checklist have been successfully verified.

9. The computerized method according to claim 1, further comprising providing an error message in response to a negative verification result indicating that at least one resource in the checklist is missing and/or at least one access type associated with at least one resource item in the checklist is not correct.

10. The computerized method according to claim 1, wherein the application is configured for examination of a semiconductor specimen, and is selected from a group comprising: automated defect review, automated defect classification, automated defect detection, automated segmentation of specimen images, and automated metrology based on specimen images.

11. The computerized method according to claim 1, further comprising generating the checklist of resources including said obtaining source code and executable file, running the executable file, performing static code analysis, and mapping.

12. A computerized system of resource verification for an application, the system comprising a processing and memory circuitry (PMC) configured to:
    obtain, at a target environment, a checklist of resources required for running the application, wherein the checklist is generated by:
        obtaining source code of the application and an executable file of the application;
        running the executable file, and monitoring one or more resources accessed by the application during execution thereof and corresponding access type of each resource, giving rise to a first list of resources comprising the one or more resources each associated with the access type thereof;
        performing static code analysis of the source code including searching the source code for one or more specific code patterns indicative of respective resources to be accessed and corresponding access types thereof, and generating a second list of resources based on result of the code analysis; and
        mapping the first list and second list of resources to generate the checklist of resources; and
    automatically verify the checklist of resources at the target environment, giving rise to a verification result indicative of whether each resource in the checklist is accessible with the access type as required in the checklist.

13. A non-transitory computer readable storage medium tangibly embodying a program of instructions that, when executed by a computer, cause the computer to perform a method of resource verification for an application, the method comprising:

obtaining, at a target environment, a checklist of resources required for running the application, wherein the checklist is generated by:
- obtaining source code of the application and an executable file of the application;
- running the executable file, and monitoring one or more resources accessed by the application during execution thereof and corresponding access type of each resource, giving rise to a first list of resources comprising the one or more resources each associated with the access type thereof;
- performing static code analysis of the source code including searching the source code for one or more specific code patterns indicative of respective resources to be accessed and corresponding access types thereof, and generating a second list of resources based on result of the code analysis; and
- mapping the first list and second list of resources to generate the checklist of resources; and automatically verifying the checklist of resources at the target environment, giving rise to a verification result indicative of whether each resource in the checklist is accessible with the access type as required in the checklist.

14. The non-transitory computer readable storage medium of claim 13, wherein the checklist of resources comprises one or more resources with respect to at least one of the following types: memory, registry, storage, operating system (OS) configuration, network configuration, and external resources with respect to other entities operatively connected thereto.

15. The non-transitory computer readable storage medium of claim 13, wherein the mapping comprises comparing the resources in the first list and the second list, and integrating non-duplicated resources of the two lists to generate the checklist of resources.

16. The non-transitory computer readable storage medium of claim 13, further comprising installing the application in response to a positive verification result indicating that all resources in the checklist have been successfully verified.

17. The non-transitory computer readable storage medium of claim 13, further comprising providing an error message in response to a negative verification result indicating that at least one resource in the checklist is missing and/or at least one access type associated with at least one resource item in the checklist is not correct.

18. The non-transitory computer readable storage medium of claim 13, wherein the application is configured for examination of a semiconductor specimen, and is selected from a group comprising: automatic defect review, automatic defect classification, automatic defect detection, automatic segmentation, and automatic metrology based on specimen images.

19. A computerized method of generating a checklist of resources required for running an application, the method performed by a processing and memory circuitry (PMC) and comprising:

obtaining source code of the application and an executable file of the application;
running the executable file, and monitoring one or more resources accessed by the application during execution thereof and corresponding access type of each resource, giving rise to a first list of resources comprising the one or more resources each associated with the access type thereof;
performing static code analysis of the source code including searching the source code for one or more specific code patterns indicative of respective resources to be accessed and corresponding access types thereof, and generating a second list of resources based on result of the code analysis; and
mapping the first list and second list of resources to generate the checklist of resources, wherein the checklist is usable for verifying the accessibility of the resources in the checklist prior to installing the application.

20. The computerized method according to claim 19, wherein the running the executable file is performed in a test environment of the application.

21. The computerized method according to claim 19, wherein the checklist of resources comprises one or more resources with respect to at least one of the following types: memory, registry, storage, operating system (OS) configuration, network configuration, and external resources with respect to other entities operatively connected thereto.

22. The computerized method according to claim 19, wherein the monitoring is performed by using a system monitoring tool.

23. The computerized method according to claim 19, wherein the static code analysis is performed in a development environment of the application.

24. The computerized method according to claim 19, wherein the mapping comprises comparing the resources in the first list and the second list, and integrating non-duplicated resources of the two lists to generate the checklist of resources.

25. A non-transitory computer readable storage medium tangibly embodying a program of instructions that, when executed by a computer, cause the computer to perform a method of generating a checklist of resources required for running an application, the method comprising:

obtaining source code of the application and an executable file of the application;
running the executable file, and monitoring one or more resources accessed by the application during execution thereof and corresponding access type of each resource, giving rise to a first list of resources comprising the one or more resources each associated with the access type thereof;
performing static code analysis of the source code including searching the source code for one or more specific code patterns indicative of respective resources to be accessed and corresponding access types thereof, and generating a second list of resources based on result of the code analysis; and
mapping the first list and second list of resources to generate the checklist of resources.

26. The non-transitory computer readable storage medium according to claim 25, wherein the checklist of resources comprises one or more resources with respect to at least one of the following types: memory, registry, storage, operating system (OS) configuration, network configuration, and external resources with respect to other entities operatively connected thereto.

27. The non-transitory computer readable storage medium according to claim 25, wherein the mapping comprises comparing the resources in the first list and the second list, and integrating non-duplicated resources of the two lists to generate the checklist of resources.

28. A computerized method of installing an application, the method performed by a processing and memory circuitry (PMC) and comprising:
- receiving, at a target environment, an application package including: the application to be installed at the target environment, an installer program usable for installing the application, and a verification utility attached to the installer program and configured to verify, prior to installation of the application, one or more resources required for running the application, wherein the verification utility includes: a checklist of resources including the one or more resources each associated with an access type thereof, and a verification program including a set of verification instructions capable of verifying accessibility of each resource in the checklist of resources;
- executing the verification program at the target environment to obtain a verification result indicative of whether each resource in the checklist is accessible with the access type as required in the checklist; and
- installing the application using the installer program in response to a positive verification result indicating that all resources in the checklist have been successfully verified.

29. The computerized method according to claim 28, further comprising providing an error message in response to a negative verification result indicating that at least one resource in the checklist is missing and/or at least one access type associated with at least one resource item in the checklist is not correct.

30. The computerized method according to claim 28, wherein the checklist is generated by:
- obtaining source code of the application and an executable file of the application;
- running the executable file, and monitoring one or more resources accessed by the application during execution thereof and corresponding access type of each resource, giving rise to a first list of resources comprising the one or more resources each associated with the access type thereof;
- performing static code analysis of the source code including searching the source code for one or more specific code patterns indicative of respective resources to be accessed and corresponding access types thereof, and generating a second list of resources based on result of the code analysis; and
- mapping the first list and second list of resources to generate the checklist of resources.

* * * * *